United States Patent
Coon et al.

(10) Patent No.: US 8,055,856 B2
(45) Date of Patent: Nov. 8, 2011

(54) LOCK MECHANISM TO ENABLE ATOMIC UPDATES TO SHARED MEMORY

(75) Inventors: Brett W. Coon, San Jose, CA (US);
John R. Nickolls, Los Altos, CA (US);
Lars Nyland, Carrboro, NC (US); Peter C. Mills, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 792 days.

(21) Appl. No.: 12/054,267

(22) Filed: Mar. 24, 2008

(65) Prior Publication Data
US 2009/0240860 A1    Sep. 24, 2009

(51) Int. Cl.
*G06F 12/00* (2006.01)

(52) U.S. Cl. ............... 711/152; 711/147; 711/E12.091

(58) Field of Classification Search .................. None
See application file for complete search history.

(56) References Cited

U.S. PATENT DOCUMENTS

| | | | | |
|---|---|---|---|---|
| 4,574,350 A | * | 3/1986 | Starr | 710/200 |
| 5,168,564 A | * | 12/1992 | Barlow et al. | 714/19 |
| 6,816,952 B1 | * | 11/2004 | Vartti et al. | 711/163 |
| 7,458,076 B2 | * | 11/2008 | Swanberg et al. | 718/100 |
| 2002/0138544 A1 | * | 9/2002 | Long | 709/107 |
| 2004/0153691 A1 | * | 8/2004 | Fujimoto et al. | 714/3 |
| 2008/0250509 A1 | * | 10/2008 | Ahvenainen | 726/34 |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Eggers, et al., "Simultaneous Multithreading: A Platform for Next-Generation Processors," *IEEE Micro*, vol. 17, No. 5, pp. 12-19, Sep./Oct. 1997.
Moss, et al. "Toward Acceleration of RSA Using 3D Graphics Hardware," LNCS 4887, Dec. 2007, pp. 369-388.

* cited by examiner

*Primary Examiner* — Reginald Bragdon
*Assistant Examiner* — Aracelis Ruiz
(74) *Attorney, Agent, or Firm* — Patterson & Sheridan, LLP (57) ABSTRACT

A system and method for locking and unlocking access to a shared memory for atomic operations provides immediate feedback indicating whether or not the lock was successful. Read data is returned to the requestor with the lock status. The lock status may be changed concurrently when locking during a read or unlocking during a write. Therefore, it is not necessary to check the lock status as a separate transaction prior to or during a read-modify-write operation. Additionally, a lock or unlock may be explicitly specified for each atomic memory operation. Therefore, lock operations are not performed for operations that do not modify the contents of a memory location.

18 Claims, 7 Drawing Sheets

LOCK MECHANISM TO ENABLE ATOMIC UPDATES TO SHARED MEMORY

BACKGROUND OF THE INVENTION

1. Field of the Invention

The present invention generally relates to reading and writing a shared memory and more specifically to a system and method for locking and unlocking access to the shared memory for atomic updates.

2. Description of the Related Art

Current mechanisms for locking and unlocking memory accesses to shared memory, such as a conventional load link and store-condition instructions that are used by many processors to implement atomic memory operations, check the lock status for each entry being accessed prior to each store (write) operation. Additionally, the requestor typically does not receive feedback on whether or not a lock has been acquired until after the store operation is attempted.

Accordingly, what is needed in the art is an improved locking mechanism for accessing shared memory to perform atomic memory operations.

SUMMARY OF THE INVENTION

A system and method for locking and unlocking access to a shared memory for atomic operations provides immediate feedback indicating whether or not the lock was successful. Read data is returned to the requestor with the lock status. The lock status may be changed concurrently when locking during a read or unlocking during a write. Therefore, it is not necessary to check the lock status as a separate transaction prior to or during a read-modify-write operation. Additionally, a lock or unlock may be explicitly specified for each atomic memory operation. Therefore, lock operations are not performed for operations that do not modify the contents of a memory location. A lock bit that indicates the lock status is not necessarily needed for each memory location in the shared memory since each lock bit may be shared amongst several locations by allowing memory address aliasing. Explicit lock operations may be used to reduce the number of false memory location contentions resulting from memory address aliasing.

Various embodiments of a method of the invention for performing atomic updates to a shared memory include receiving a memory request for accessing an entry of the shared memory corresponding to an address. A lock address of a lock entry that stores a lock flag is determined using the address. A lock result that indicates whether or not a lock is acquired for the entry of the shared memory corresponding to the address is computed for the lock address. The lock flag is set to indicate that the entry is locked by the memory request and prevent another memory request from writing the entry of the shared memory corresponding to the address. The data stored in the entry of the shared memory corresponding to the address is read.

Various embodiments of the invention include a system for accessing a shared memory. The system includes a shared storage resource to store data in multiple entries that is coupled to a memory lock unit. The shared storage is configured to receive a memory request for accessing an entry of the shared storage resource corresponding to an address and output data stored in the entry corresponding to the address. The memory lock unit is configured to receive a lock request that is specified with the memory request, determine a lock address of a lock entry that stores a lock flag using the address, and set the lock flag to indicate that the entry is locked by the memory request to prevent another memory request from writing the entry of the shared storage resource corresponding to the address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
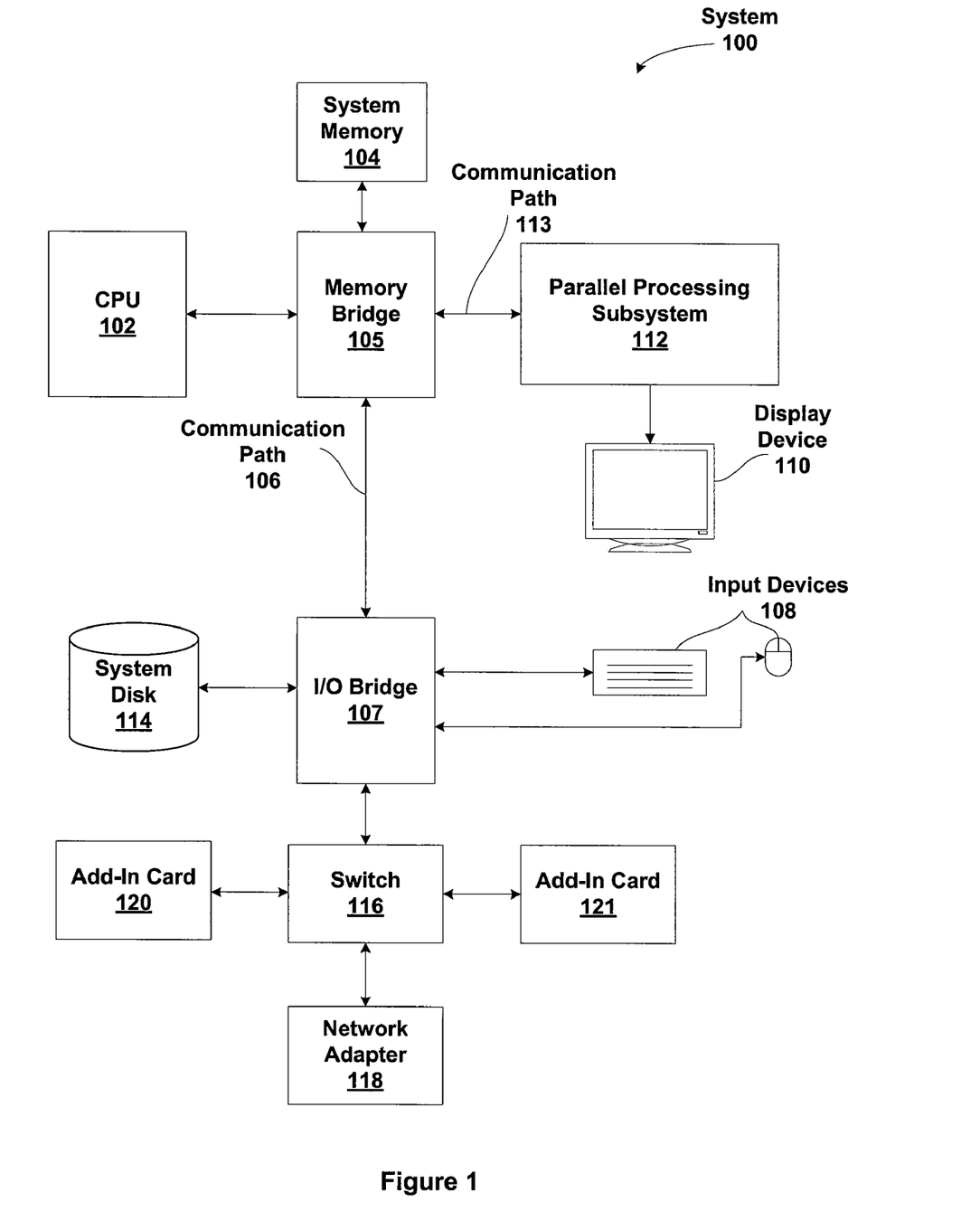
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
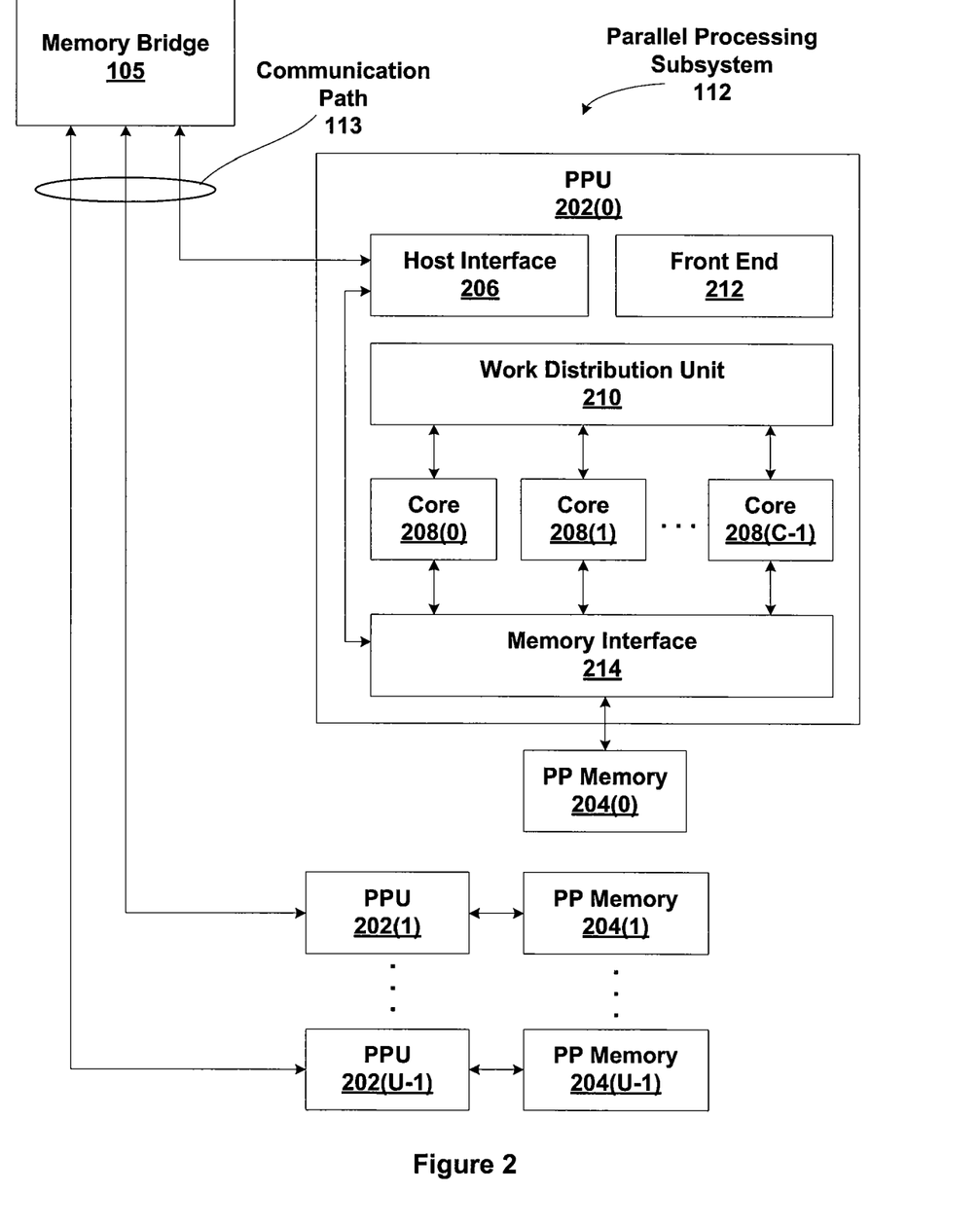
FIG. 2 is a block diagram of a parallel processing subsystem for the computer system of FIG. 1 in accordance with one or more aspects of the present invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
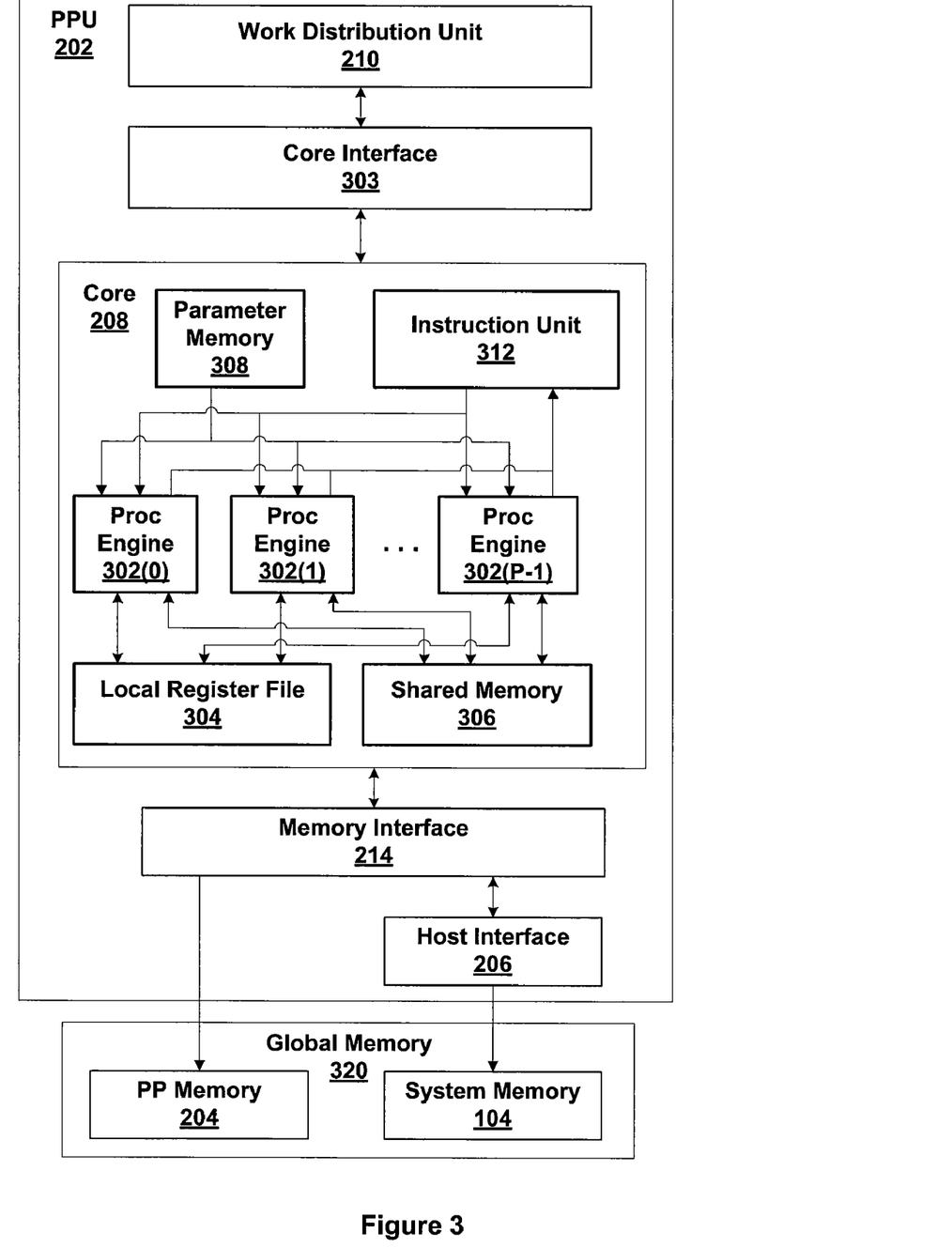
FIG. 3 is a block diagram of a parallel processing unit for the parallel processing subsystem of FIG. 2 in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In some embodiments, single-instruction, multiple-thread (SIMT) techniques are used to support parallel execution of a large number of generally synchronized threads, using a common instruction unit configured to issue instructions to a set of processing engines. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In a way similar to a SIMD machine, a SIMT parallel processing core 208 executes instances of a single parallel program on different data across a plurality of parallel processing engines 302 included in the core 208. Thus, for example, the core 208 may be configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "warp" or "thread group." Additionally, a plurality of related thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is typically an integer multiple of the number of parallel processing engines 302 in a core 208, and m is the number of thread groups simultaneously active on the core 208. The size of a CTA is generally determined by the programmer and the amount of hardware resources, such as memory or registers, available to the CTA.

In one embodiment, each core 208 includes an array of P (e.g., 8, 16, etc.) parallel processing engines 302 configured to receive SIMT instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate synchronous parallel execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208 and may be used to transfer data between different threads. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) may be issued to all P processing engines 302. Thus, at the level of a single clock cycle, core 208 implements a microarchitecture substantially representing a P-way SIMT or SIMD design. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in thread groups. As used herein, a "thread group" refers to a group of up to P threads of execution of the same program on different input data, with one thread of the group being assigned to each processing engine 302. A thread group may include fewer than P threads, in which case some of processing engines 302 will be idle during cycles when that thread group is being processed. A thread group may also include more than P threads, in which case processing will take place over consecutive clock cycles. Since each processing engine 302 can support up to G threads concurrently, it follows that up to G thread groups can be executing in core 208 at any given time.

On each clock cycle, one instruction is issued to all P threads making up a selected one of the G thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 may be synchronously executing the same instruction for different threads in the same thread group. Those skilled in the art will recognize that such synchronous parallel execution of each thread in a thread group is characteristic of a SIMD architecture. When the threads in a thread group are executing synchronously, processing engines 302 are configured to execute instructions in a SIMD manner. However, in some instances, some threads in a thread group may be temporarily idle, e.g., due to conditional or predicated instructions, divergence at branches in the program, or the like, as described further herein. Processing engines 302 may be configured to function as SIMD or SIMT engines.

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or thread group in instruction unit 312, then signals instruction unit 312 to begin executing the threads. When execution of a thread or thread group is completed, core 208 advantageously notifies core interface 303. Core interface 303 can then initiate other processes, e.g., to retrieve output data from shared memory 306 and/or to prepare core 208 for execution of additional threads or thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Persons skilled in the art will understand that the architecture described in FIGS. 1, 2 and 3 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Thread Arrays and Cooperative Thread Arrays

In some embodiments, multithreaded processing core 208 of FIG. 3 can execute general-purpose computations using thread blocks or thread arrays. A thread array consists of a number (no) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are arranged as "cooperative" thread arrays, or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

When shared memory 306 is used to communicate between threads, in particular when threads perform read-modify-write operation on memory locations atomically with respect to other threads in a CTA, memory lock and unlock operations should be used to ensure that the read and write operations produce the correct results. An example of an application that requires support for atomic updates to shared memory 306 is a multi-threaded histogram. Each thread reads an input and the increments the appropriate histogram bin, where the bins will logically be stored in shared memory 306 to allow high speed access and sharing across threads. If multiple threads need to increment the same bin, the read-modify-write sequence of operations by one thread must not be interrupted by writes from another thread, or else the final result stored in shared memory 306 may be incorrect. As described in conjunction with FIG. 4B, a memory lock unit locks and unlocks memory locations within shared memory 306 to provide support for atomic updates of shared memory 306.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions of an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set or produces one portion of the output data set. A CTA program can implement algorithms using a wide range of mathematical and logical operations, and the program can include conditional or branching execution paths and direct and/or indirect memory access.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Multithreaded Instruction Processing

Figure 4A:
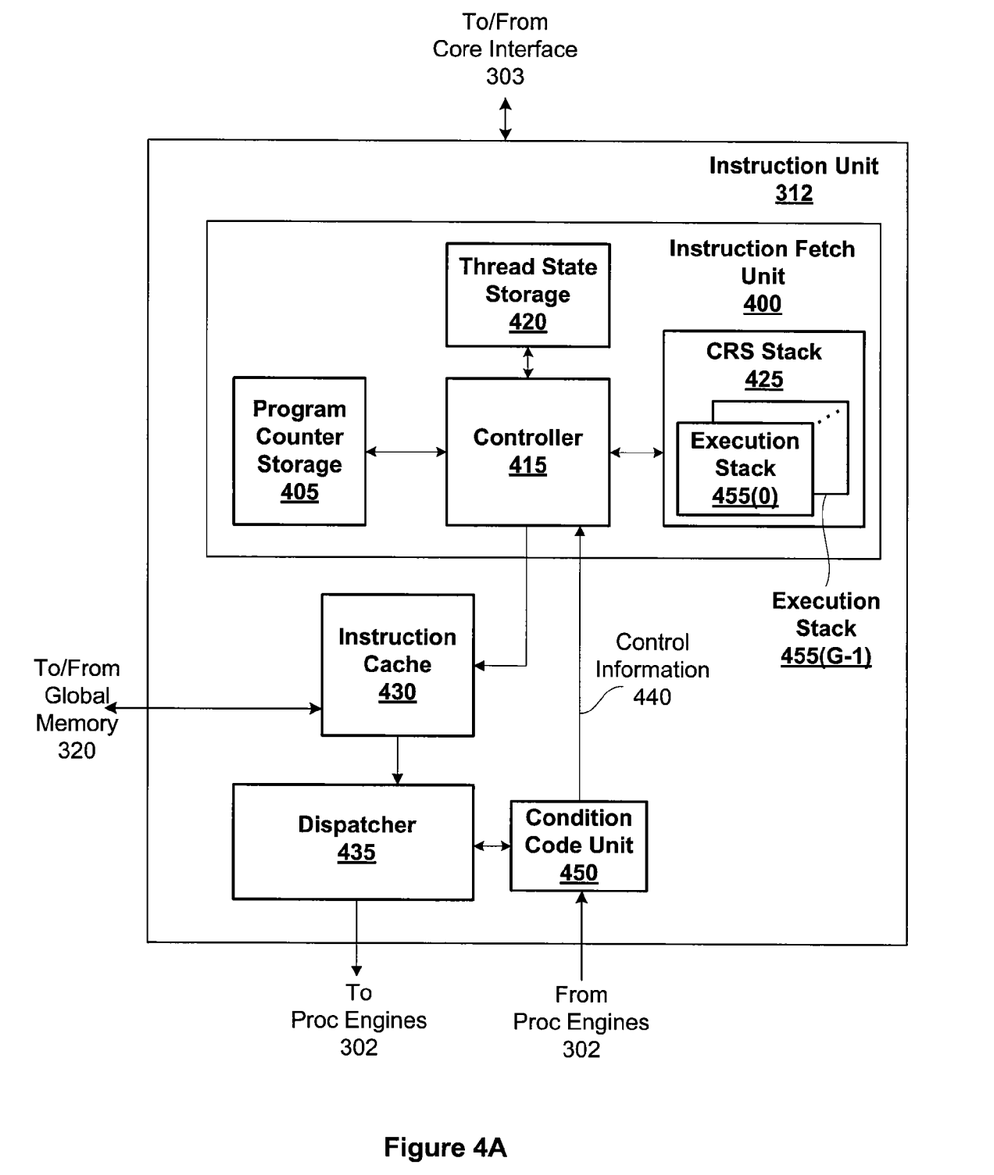
FIG. 4A is a block diagram of an instruction unit for the parallel processing unit of FIG. 3 in accordance with one or more aspects of the present invention.

FIG. 4A is a block diagram of instruction unit 312 for the parallel processing unit 202 of FIG. 3, in accordance with one or more aspects of the present invention. Instruction unit 312 includes an instruction fetch unit 400, instruction cache 430, dispatcher 435, and condition code unit 450. Instruction fetch unit 400 receives data to be processed and a program identifier corresponding to a program that should be used to process the data.

A program counter storage 405 stores the active program counter, indicating the next program instruction (INSTR) that should be executed for each thread group. When G=24, program counter storage 405 stores 24 active program counters. Similarly, thread state storage 420 stores an active mask for each thread group, where each bit of the active mask corresponds to an integer number of the P, processing engines 302. Therefore, the number of bits in the active mask is the number of threads in a thread group. Thread state storage 420 also stores a disable mask for each thread group. The disable mask includes a flag for each one of the threads in the thread group. The flag indicates if a thread is enabled, disabled for the processing of a conditional return instruction, disabled for the processing of a conditional break instruction, or if the thread has exited the program. The processing of these instructions and determination of the disable mask is described in conjunction with FIGS. 5A, 5B, and 7.

CRS (call, return, synchronization) stack 425 includes an execution stack for each thread group, shown as execution stacks (0) through (G-1) in FIG. 4. The execution stacks are used during control instruction processing to push and pop tokens that include state information, e.g., token type, token program counter, and token mask. In some embodiments of the present invention, CRS stack 425 may spill entries to global memory 320 for any execution stacks 455 that overflow and restore spilled entries when space is available in CRS stack 425. Controller 415 pushes and pops entries from CRS stack 425 as control instructions are executed. In one embodiment, there are six types of control instructions: conditional branch instructions, call instructions, PreBreak instructions, PreReturn instructions, conditional return instructions, synchronization instructions, and conditional break instructions. Alternative embodiments may include more or fewer types of control instructions as well as different types of control instructions.

Controller 415 provides an active program counter and active mask for a thread group to instruction cache 430. Instruction cache 430 obtains the instruction corresponding to the active program counter and outputs the instruction and active mask to dispatcher 435. Instruction cache 430 reads the instructions from global memory 320 as needed, using caching techniques known to those skilled in the art. Controller 415 receives control information from condition code unit 450 via control information 440 when a control instruction is executed. The control information includes a token type indicating the type of control instruction, a stack unwind signal, and other data needed to push tokens onto CRS stack 425 and update the active mask and disable mask for the thread group.

Dispatcher 435 decodes the instruction and outputs conditional data for any conditional control instructions (conditional branch, conditional break, and conditional return) to condition code unit 450. The conditional data includes the condition test and the comparison value (specified by the control instruction) to which the condition code is applied. Conventionally condition codes are used to evaluate the condition test specified by the instruction for a comparison value to produce a true or false result. Six of the eight condition tests for integer values are conventional condition tests, e.g., less than (LT), equal (EQ), greater than (GT), less than or equal (LE), greater than or equal (GE), and not equal (NE). The condition tests are used to determine whether the comparison value is positive, zero, or negative.

When floating point format values are used, the condition tests may also include condition tests that define the behavior for unordered values, such as NaN (not-a-number) values. A NaN does not have an order relative to numeric values, and therefore, can yield unexpected results when used to produce a comparison value or as the input for a conventional condition test. Eight new condition tests, e.g., LEG, U, LTU, EQU, LEU, GTU, NEU, and GEU, provide for explicit handling of NaN values. LEG (less than, equal, or greater than) is only true when the comparison value is zero, positive, or negative, i.e., ordered. U (unordered) is only true when the comparison value is unordered, i.e., NaN. LTU (less than zero or unordered) is true when the comparison value is negative or NaN. EQU (equal to zero or unordered) is only true when the comparison value is zero or NaN. LEU (less than or equal to zero or unordered) is only true when the comparison value is negative, zero, or NaN. GTU (greater than zero or unordered) is only true when the comparison value is positive or NaN. NEU (not equal to zero or unordered) is only true when the comparison value is positive, negative, or NaN. GEU (greater than or equal to zero or unordered) is only true when the comparison value is positive, zero, or NaN.

The other two conventional condition tests (for integer and floating point values) are always (TR) and never (FL). Additional condition tests, such as overflow and carry, may also be used and the number of condition tests is increased accordingly. The comparison value may be computed during execution of the program and each thread in the thread group may have a comparison value. Therefore, some threads may produce a true result while others produce a false result, when the condition test is evaluated. When one or more active threads produce a different condition test result than other active threads, the threads diverge and CRS stack 435 is used to store a token including an active mask and program counter for the side of the branch that will be executed after a first side of the branch has completed execution.

In addition to the conditional data, dispatcher also outputs the control instruction (call, break, return, branch, or the like), any target program counter (address) specified by the instruction, and active mask to condition code unit 450. Control instructions are not output to processing engines 203 by dispatcher 435. Instead, condition code unit 450 determines a "taken" mask based on the active mask that is included in the control information output to controller 415 by condition code unit 450. Specifically, condition code unit 450 uses the condition test result to determine a "taken mask" that indicates the active threads which evaluate to TRUE for the condition test specified by the instruction. Bits of the taken mask for threads in the thread group that indicate a true comparison test result are cleared. The active mask and taken mask may be used by controller 415 to update the disable mask. When a function call is performed with two or more threads having different function pointers, the function call is serialized to execute the threads specifying each unique function pointer and the taken mask is used to indicate the active threads for each unique function pointer.

Condition code unit 450 outputs the taken mask and token type to controller 415 via control information 440. When a target program counter is specified by a call or branch control instruction, the taken program counter is output by condition code unit 450 to controller 415 via control information 440. The token type indicates the type of control instruction that was executed to produce the disable mask. Token types include: sync, call, diverge, and break. Note, that when a control instruction for a thread is in-flight, i.e., output by controller 415 and not yet received by controller 415 via control information 440, another instruction for the same thread should not be output by controller 415.

Other instructions (non-control instructions), received by dispatcher 435 are queued for output to processing engines 302. Dispatcher 435 may be configured to output instructions based on the availability of (computational or storage) resources that are needed to process the instruction. In some embodiments of dispatcher 435, a scoreboarding scheme is used to track resource availability and determine which instructions can be output to processing engines 302. When processing engines 302 receive an instruction, a read request is generated to obtain any operands that are needed to execute the instruction and the read request is output to LRF 304 or shared memory 306. The instruction is then processed by processing engines 302 when the operands have been obtained.

Lock and Unlock Commands for Accessing Shared Memory

Figure 4B:
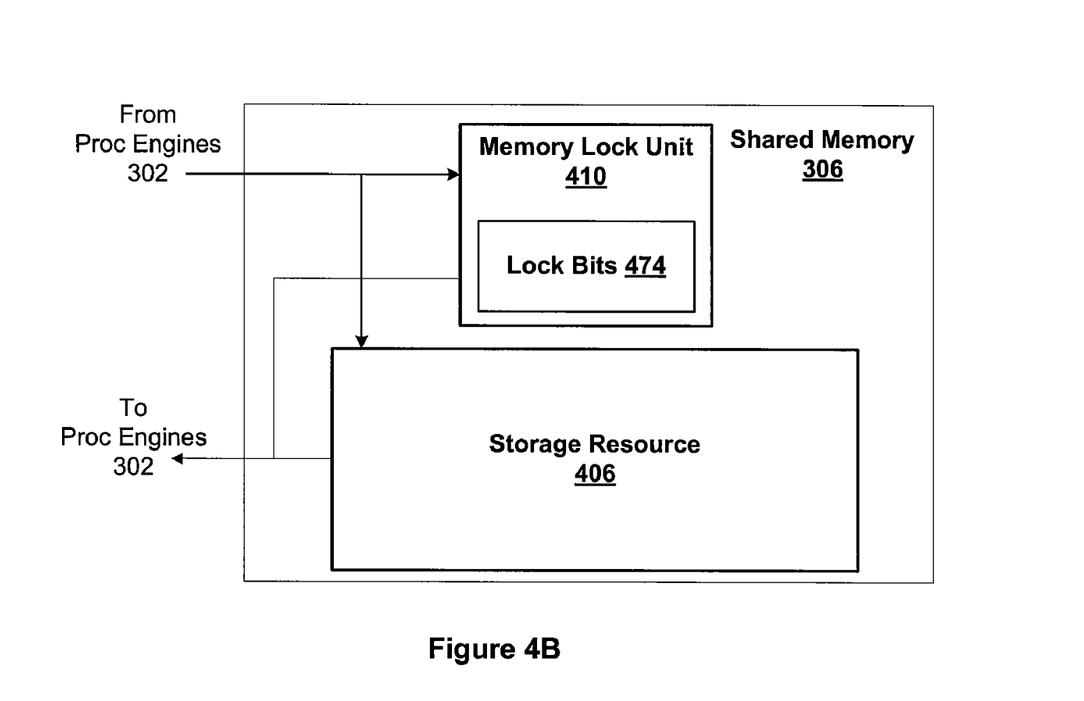
FIG. 4B is a block diagram of the shared memory unit shown in FIG. 3 in accordance with one or more aspects of the present invention.

FIG. 4B is a block diagram of shared memory 306 shown in FIG. 3, in accordance with one or more aspects of the present invention. In order to provide support for atomic operations that access locations in shared memory 306, memory read and write requests from processing engines 302 are input to a memory lock unit 410. A set of lock bits 474 are provided that store the lock status for locations within a storage resource 406. In some embodiments of the present invention, a lock bit may be dedicated for each and every addressable location within storage resource 406. In other embodiments of the present invention, each lock bit may be shared amongst several addressable locations within storage resource 406. Additionally, lock bits 474 or other lock bits may be used to cover other address spaces, such as global memory 320, and each lock bit may be shared amongst addressable locations with storage resource 406 and global memory 320.

The physical memory within storage resource 406 is subdivided dynamically to allow multiple CTAs to run concurrently. To reduce amount of storage needed for lock bits 474, multiple addresses of entries in storage resource 406 are aliased to the same lock bit in lock bits 474. A hash function may be implemented by memory lock unit 410 to map request memory addresses received from processing engines 302 to lock bit addresses, e.g., lock addresses. In preferred embodiments of the present invention, the hash function guarantees that word addresses N and N+1 will map to different lock bits, and at least 256 independent locks are provided. In some embodiments of the present invention, the hash function simply uses the low bits of the address received for the request.

Memory lock unit 410 may be added to existing shared memory read/write logic without requiring the addition of pipeline stages or decision logic in critical paths. Furthermore, the lock bits 474 may be implemented as a banked, single-ported RAM (random access memory) or latch array that has the same access requirements as storage resource 406. Specifically, existing bank conflict and address serialization logic to that is used to control access to storage resource 406 is provided by memory lock unit 410 for lock bits 474.

In order to provide support for atomic updates to shared memory 306, shared memory read and write instructions are augmented with lock acquire and lock release suffixes. A shared memory read instruction, G2R specifies a lock command suffix, .LCK, to attempt to acquire a lock for the address being read. G2R.LCK returns both the data that is stored at the indicated address and a flag that indicates if the lock was successfully acquired, as described in conjunction with FIG. 5A. The lock bits are accessed in parallel with memory read and write accesses, so that no additional pipeline stages or clock cycles are needed to acquire and release the lock.

If the lock was successfully acquired, the program may then modify the data, store the new value into the location specified by the indicated address, and release the lock (using the .UNL suffix) to allow other threads to access the location or another location whose address aliases to the same lock address as the released lock address. If the lock is not successfully acquired by the G2R.LCK instruction, then the program should attempt to acquire the lock again, as described in conjunction with FIG. 5C. Note that it is the responsibility of the program to honor the lock bits since memory lock unit 410 is not configured to track lock ownership, and thus cannot prevent a thread that has not acquired the lock from modifying a locked location in storage resource 406.

TABLE 1 is a set of program instructions for illustrating the function of a lock command (LCK) that is specified using an instruction suffix. The program instructions are presented in C pseudo-code for ease of presentation. The execution of the G2R.LCK instruction is described in conjunction with FIG. 5A.

TABLE 1

```
G2R.LCK:
    int hash_addr    = hash (address);
    return_lock      = !LockBits[hash_addr];
```

TABLE 1-continued

```
    LockBits[hash_addr] = 1;
    return_data         = memory[address];
```

Figure 5A:
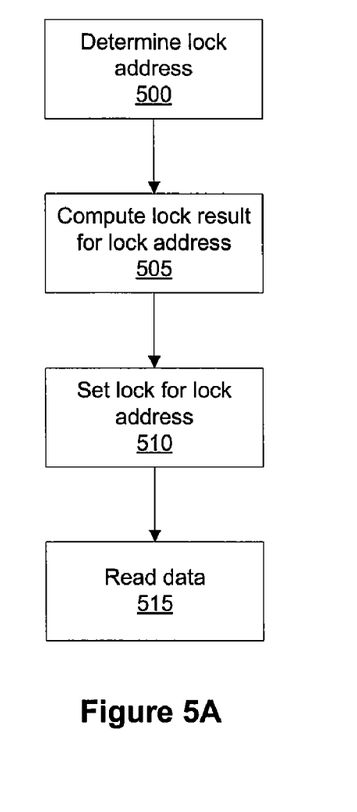
FIG. 5A is a flow diagram of method steps for performing a lock operation on the shared memory in accordance with one or more aspects of the present invention.

FIG. 5A is a flow diagram of method steps for performing the lock operation shown in TABLE 1 for shared memory 306, in accordance with one or more aspects of the present invention. In step 500 memory lock unit 410 receives the address specified for the G2R.LCK instruction and determines the hash address (hash_addr). In some embodiments of the present invention the lock address is the low 8 bits of address. Note, that when byte addresses are used, locking is performed using a 4-byte granularity and the low 8 bits of address are bits 9:2. In step 505 memory lock unit 410 computes the lock result for the lock address by reading lock bits 474 using the lock address to obtain return_lock. Within a thread group some threads may acquire a lock and other threads may not acquire a lock. If multiple threads in a thread group simultaneously attempt to lock the same address, only one thread is granted the lock.

In step 510 memory lock unit 410 sets the lock flag in lock bits 474 that corresponds to the lock address. Note that the return_lock is simply the inverse of the prior lock flag, and that the lock flag is set unconditionally. Whether or not the lock address was locked prior to this instruction, it is locked after the lock flag is read. In step 515 the entry in storage resource 406 that corresponds to the address is read to obtain the data. Importantly, the lock flag update can occur concurrently with the access to the storage resource 406 since the reading of the entry in storage resource 406 does not depend on the value of the lock flag. Therefore, no additional clock cycles or pipeline stages are needed to perform the lock operation.

TABLE 2 is a set of program instructions for illustrating the function of an unlock command (UNL) that is specified using an instruction suffix. The program instructions are presented in C pseudo-code for ease of presentation, where hash_addr is the lock address. The execution of the R2G.UNL instruction is described in conjunction with FIG. 5B.

TABLE 2

```
R2G_UNL:
    int hash_addr       = hash (address);
    LockBits[hash_addr] = 0;
    memory[address]     = data;
```

Figure 5B:
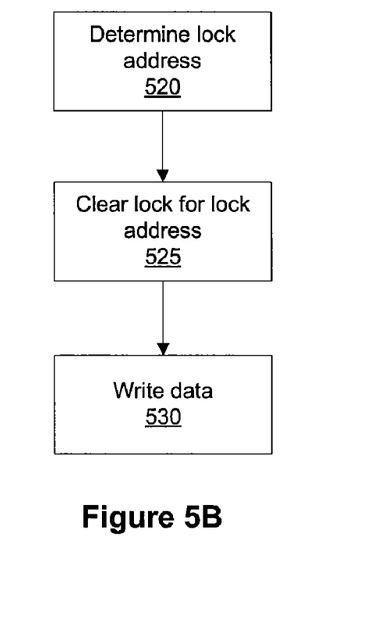
FIG. 5B is a flow diagram of method steps for performing an unlock operation on the shared memory in accordance with one or more aspects of the present invention.

FIG. 5B is a flow diagram of method steps for performing the unlock operation shown in TABLE 2 for shared memory 306, in accordance with one or more aspects of the present invention. In step 520 memory lock unit 410 receives the address specified for the R2G.UNL instruction and determines the hash address (hash_addr). In step 525 memory lock unit 410 clears the lock flag in lock bits 474 that corresponds to the lock address. In step 530 the entry in storage resource 406 that corresponds to the address is written with the data that was provided with the R2G.UNL instruction. Importantly, setting the lock flag is unconditional and occurs concurrently with the update to the entry in storage resource 406. Therefore, no additional clock cycles or pipeline stages are needed to perform the unlock operation.

TABLE 3 is a set of program instructions for illustrating using the lock and unlock command commands. The program instructions are presented in assembly pseudo-code for ease of presentation. The execution of the code shown in TABLE 3 is described in conjunction with FIG. 5C. Although described in the context of a SIMT processor, the program instructions shown in TABLES 1, 2, and 3 may be executed in any type of processor, single or multi-threaded.

TABLE 3

| | | |
|---|---|---|
| 0: | PBK LOCKDONE; | // set synchronization |
| LOOP: | | // Function definition |
| 1: | G2R.LCK C1, R2, g[A1]; | // read A1, store lock result in C1 |
| 2: | ADD R2, R2, R7; | // Add R7 to value from memory |
| 3: | R2G.UNL (C1.NE) g[A1], R2; | // store if lock succeeded |
| 4: | BRK C1.NE; | // Exit loop if lock succeeded |
| 5: | BRA LOOP; | // repeat loop if lock failed |
| LOCKDONE: | | |
| 6: | ... | |

Figure 5C:
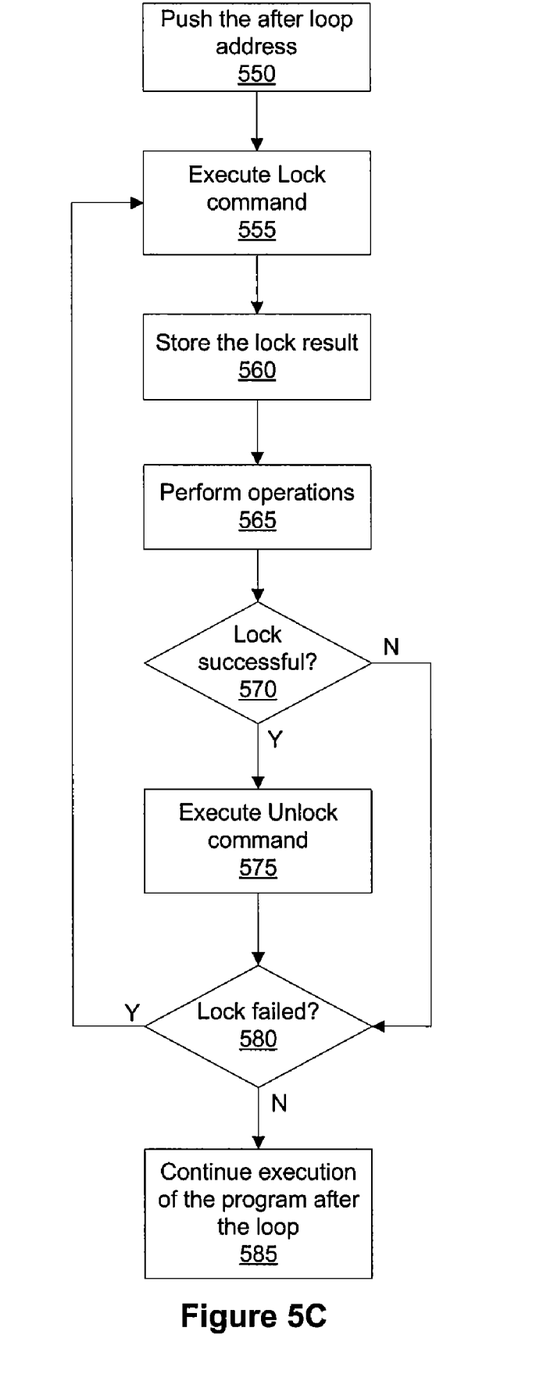
FIG. 5C is a flow diagram of method steps for using the lock and unlock commands to access the shared memory in accordance with one or more aspects of the present invention.

FIG. 5C is a flow diagram of method steps for using the lock and unlock commands to allow atomic updates to shared memory 306, in accordance with one or more aspects of the present invention. Controller 415 fetches the program instruction corresponding to the current setting of the active program counter (PC) for a thread by outputting the active program counter to instruction cache 430. Dispatcher 435 determines that the prebreak instruction (PBK) is a control instruction and outputs the PBK instruction to condition code unit 450. In step 550 the prebreak instruction is executed to push the after loop address, LOCKDONE onto CRS stack 425 to continue execution of the program following the atomic update of shared memory 306. As threads complete their locked operation (e.g. the successfully acquire the lock), they execute a break instruction (BRK) that causes them to be disabled until all threads in the thread group succeed at acquiring the lock. When last thread(s) execute the break instruction the PBK token is finally popped off the stack and control transfers to the LOCKDONE address, using the original active mask that was in effect at the time of the PBK instruction. The threads in the thread group do not diverge the last time the break instruction is executed, and therefore the condition is met that causes the threads to exit the loop. After executing the prebreak instruction, controller 415 increments the active program counter stored for the thread in program counter storage 405 to point to the next instruction for the thread.

In step 555 the G2R.LCK instruction is output by dispatcher 435 to processing engines 302. The lock command is executed for address A1 and the data read from the address specified by A1 is stored in register R2 of LRF 304. In step 560 the value of the lock flag for each thread in the thread group is output by memory lock unit 410 and stored in a condition register, C1 (not shown). The value of C1 is provided as an input by processing engines 302 to condition code unit 450 and the active program counter is incremented.

In step 565 the ADD instruction is output by dispatcher 435 to processing engines 302 to perform an operation on the value read from shared memory 306. Processing engines 302 update the value stored in R2 as the sum of the values in registers R2 and R7 and the active program counter is incremented. In step 570 dispatcher 435 evaluates the condition specified by C1.NE to determine which lock results indicated that the lock was successful. For those threads which whose lock results indicate that the lock was successful in step 570, the unlock command is executed in step 575 to clear the respective lock flag and write the modified data stored in R2 into the location corresponding to address A1 of shared memory 306. The active program counter is incremented and the method proceeds to step 580. In step 570 any threads that failed to acquire a lock bypass step 575 and proceed directly to step 580 while incrementing the active program counter.

In step 580 controller 415 determines if any of the active threads diverge based on the taken mask provided by condition code unit 450 when the C1.NE condition is evaluated for the conditional break instruction. Condition code unit 450 outputs control information to controller 415 that includes the taken mask, token type, and the target program counter. If, controller 415 determines that at least one active thread diverges from the other active threads in the thread group, then controller 415 disables the threads for which condition C1.NE is true, and continues executing with a reduced active mask. The token program counter equals the active program counter incremented to specify the next instruction in the thread.

Controller 415 determines the active mask as the taken mask which indicates the active threads that evaluated TRUE for the condition test because the attempted lock was unsuccessful. Controller 415 sets the active program counter to the target program counter (address) specified by the branch instruction, LOOP, and steps 555, 560, 565, and 570 are repeated until all of the active threads in the thread group successfully acquire a lock. Note that the method allows for forward progress to be made, even when address aliasing causes multiple threads to attempt to access the same lock bit, since threads that have acquired a lock write data and release the lock.

Threads that have completed step 575 wait for any threads that did not successfully lock their respective entry in shared memory 306 to complete steps 575. Once all of the active threads execute the unlock command and associated instruction, the threads do not diverge and all active threads pass the condition test for the break instruction, so in step 585 the diverge token is popped from CRS stack 425 to execute the first instruction at LOCKDONE. Persons skilled in the art will understand that any system configured to perform the method steps shown in FIGS. 5A, 5B, and 5C, in any order, is within the scope of the present invention.

The system and method provide an improved locking mechanism for accessing shared memory to perform atomic memory operations. Specifically, immediate feedback is provided that indicates whether or not the lock was successful. Read data is returned to the requestor with the lock result, enabling the requestor to process the data. The lock status may be changed concurrently when locking during a read or unlocking during a write so that there is no additional overhead in terms of latency to check the lock status as a separate transaction during a read-modify-write operation. Additionally, a lock or unlock may be explicitly specified for each atomic memory operation so that contention due to address aliasing only impacts operations that may modify data.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for performing atomic updates to a shared memory, the method comprising:
receiving a memory request for accessing an entry of the shared memory corresponding to an address;
determining a lock address of a lock entry that stores a lock flag using the address;
computing a lock result for the lock address that indicates whether or not a lock is acquired for the entry of the shared memory corresponding to the address;
setting the lock flag to indicate that the entry is locked by the memory request to prevent another memory request from writing the entry of the shared memory corresponding to the address; and
reading data stored in the entry of the shared memory corresponding to the address,
wherein the steps of determining, computing, setting, and reading are performed in parallel for multiple execution threads of a program, and the execution of the threads diverges when lock results for the multiple threads indicate that at least one of the multiple threads did not acquire a lock.

2. The method of claim 1, further comprising:
performing operations using the data to produce modified data; and
clearing the lock flag, when the lock result indicates that the lock was acquired for the entry, to indicate that the entry is unlocked by the memory request.

3. The method of claim 2, further comprising writing the modified data to the entry of the shared memory corresponding to the address.

4. The method of claim 1, further comprising repeating the steps of computing the lock result, setting the lock flag, and reading the data when the lock result indicates that the lock was not acquired for the entry.

5. The method of claim 1, wherein the lock address is a portion of the address of the entry in the shared memory.

6. The method of claim 1, wherein an instruction specifying the memory request explicitly indicates that the entry in the shared memory will be locked during execution of the instruction.

7. The method of claim 1, wherein an instruction specifying the memory request explicitly indicates that the entry in the shared memory will be unlocked during execution of the instruction.

8. The method of claim 1, further comprising synchronizing execution of the multiple threads to resume parallel execution after each one of the multiple threads acquire a lock.

9. The method of claim 1, wherein the lock flag is shared by two or more addresses of entries in the shared memory.

10. A non-transitory computer readable storage medium storing instructions for causing a processor to access a shared memory by performing the steps of:
receiving a memory request for accessing an entry of the shared memory corresponding to an address;
determining a lock address of a lock entry that stores a lock flag using the address;
computing a lock result for the lock address that indicates whether or not a lock is acquired for the entry of the shared memory corresponding to the address;
setting the lock flag to indicate that the entry is locked by the memory request to prevent another memory request from writing the entry of the shared memory corresponding to the address; and
reading data stored in the entry of the shared memory corresponding to the address,
wherein the steps of determining, computing, setting, and reading are performed in parallel for multiple execution threads of a program, and the execution of the threads diverges when lock results for the multiple threads indicate that at least one of the multiple threads did not acquire a lock.

11. The non-transitory computer readable storage medium of claim 10, further comprising:
performing operations using the data to produce modified data; and
clearing the lock flag, when the lock result indicates that the lock was acquired for the entry, to indicate that the entry is unlocked by the memory request.

12. The non-transitory computer readable storage medium of claim 10, further comprising repeating the steps of computing the lock result, setting the lock flag, and reading the data when the lock result indicates that the lock was not acquired for the entry.

13. The non-transitory computer readable storage medium of claim 10, wherein the lock flag is shared by two or more addresses of entries in the shared memory.

14. A system for performing atomic updates to a shared memory, the system comprising:
a shared storage resource to store data in multiple entries and configured to:
receive a memory request for accessing an entry of the shared storage resource corresponding to an address; and
output data stored in the entry corresponding to the address; and
a memory lock unit coupled to the shared storage resource and configured to:
receive a lock request that is specified with the memory request;
determine a lock address of a lock entry that stores a lock flag using the address; and
set the lock flag to indicate that the entry is locked by the memory request to prevent another memory request from writing the entry of the shared storage resource corresponding to the address,
wherein determining the lock address and setting the lock flag are performed in parallel for multiple execution threads of a program, and the execution of the threads diverges when lock results for the multiple threads indicate that at least one of the multiple threads did not set the lock flag.

15. The system of claim 14, wherein the memory lock unit is further configured to compute a lock result for the lock address that indicates whether or not a lock is acquired for the entry of the shared storage resource corresponding to the address.

16. The system of claim 14, wherein the memory lock unit is further configured to:
   receive an unlock request that is specified with a second memory request for accessing the entry of the shared storage resource corresponding to the address; and
   clear the lock flag, when the lock result indicates that the lock was acquired for the entry, to indicate that the entry is unlocked by the second memory request.

17. The system of claim 16, wherein the shared storage resource is further configured to:
   receive the second memory request for accessing the entry of the shared storage resource corresponding to the address; and
   write modified data to the entry of the shared storage resource corresponding to the address.

18. The system of claim 14, wherein the lock flag is shared by two or more addresses of entries in the shared storage resource.

* * * * *